(12) United States Patent
Tanaka et al.

(10) Patent No.: US 9,324,008 B2
(45) Date of Patent: Apr. 26, 2016

(54) CLASSIFIER UPDATE DEVICE, INFORMATION PROCESSING DEVICE, AND CLASSIFIER UPDATE METHOD

(71) Applicant: OMRON Corporation, Kyoto-Shi (JP)

(72) Inventors: Kiyoaki Tanaka, Kizugawa (JP); Takayoshi Yamashita, Kizugawa (JP)

(73) Assignee: OMRON CORPORATION, Kyoto-shi (JP)

( * ) Notice: Subject to any disclaimer, the term of this patent is extended or adjusted under 35 U.S.C. 154(b) by 37 days.

(21) Appl. No.: 14/223,349

(22) Filed: Mar. 24, 2014

(65) Prior Publication Data
US 2014/0307957 A1    Oct. 16, 2014

(30) Foreign Application Priority Data

Apr. 15, 2013   (JP) .................................. 2013-085303

(51) Int. Cl.
G06K 9/62    (2006.01)
G06K 9/66    (2006.01)
G06K 9/46    (2006.01)

(52) U.S. Cl.
CPC .............. *G06K 9/66* (2013.01); *G06K 9/4614* (2013.01); *G06K 9/6256* (2013.01)

(58) Field of Classification Search
None
See application file for complete search history.

(56) References Cited

U.S. PATENT DOCUMENTS

| 5,052,043 | A   |   | 9/1991  | Gaborski |         |
|-----------|-----|---|---------|----------|---------|
| 8,457,391 | B2  | * | 6/2013  | Ai et al.| 382/159 |
| 2011/0026810 | A1 | * | 2/2011 | Hu       | 382/155 |
| 2012/0300980 | A1 | * | 11/2012 | Yokono  | 382/103 |

FOREIGN PATENT DOCUMENTS

| EP | 2 164 025 A1   | 3/2010 |
|----|----------------|--------|
| JP | 2005-115525 A  | 4/2005 |
| JP | 2008-204103 A  | 9/2008 |
| JP | 2009-064162 A  | 3/2009 |
| JP | 2010-009517 A  | 1/2010 |
| JP | 2010-061415 A  | 3/2010 |
| JP | 2010-170199 A  | 8/2010 |
| JP | 2011-138387 A  | 7/2011 |

OTHER PUBLICATIONS

Extended European Search Report for Application No. 14161958.5 issued Jul. 29, 2014 (7 pages).
Viola et al., Rapid Object Detection using a Boosted Cascade of Simple Features. Proceedings of 2001 IEEE Conference on Computer Vision and Pattern Recognition. Kauai, Hawaii, 2001,I-511-I-518, XP010583787.

* cited by examiner

*Primary Examiner* — Daniel Mariam
(74) *Attorney, Agent, or Firm* — Nutter McClennen & Fish LLP; John J. Penny, Jr.

(57) ABSTRACT

One aspect of the present invention provides a classifier update device that enhances accuracy of the determination made by a classifier with respect to a specific determination target. A feature quantity update unit updates a reference value of a predetermined criterion in the classifier based on target image data including a specific type of target acquired by an image acquisition unit.

9 Claims, 12 Drawing Sheets

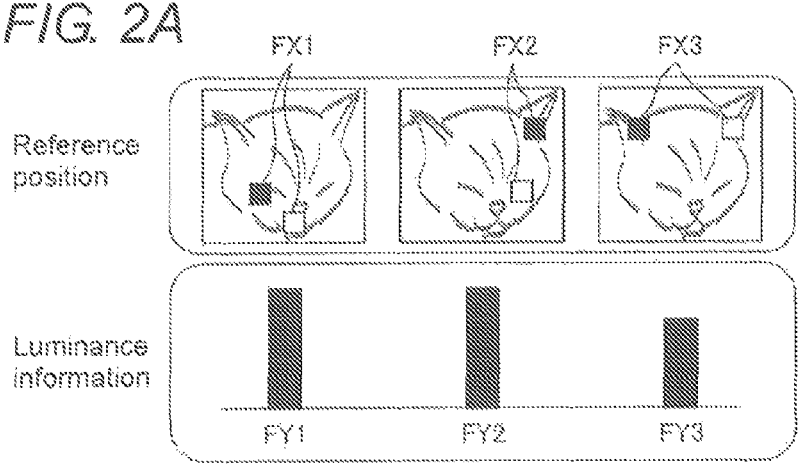
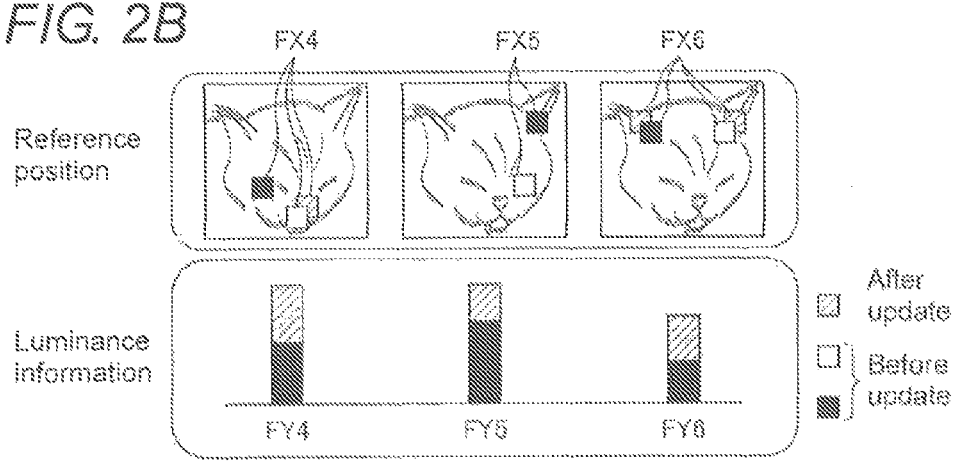

CLASSIFIER UPDATE DEVICE, INFORMATION PROCESSING DEVICE, AND CLASSIFIER UPDATE METHOD

CROSS-REFERENCE TO RELATED APPLICATION

This application claims the benefit of priority from Japanese Patent Application No. 2013-085303, filed on 15 Apr. 2013, the entire contents of which is incorporated herein by reference for all purposes.

FIELD

The present invention relates to a classifier update device that updates a classifier for determining a determination target in an image, an information processing device, and a classifier update method.

BACKGROUND

Conventionally, there has been developed a classifier that determines the determination target such as a face of a pet such as a dog and a cat or a person included in the image. The classifier sets an area in the image as a search area, extracts a feature included in a display object in the search area, and determines that the determination target is present in the search area when the feature of the display object is matched with or similar to the feature of the determination target. FIGS. 13A and 13B schematically illustrate search areas RX and RX' in the image. In FIGS. 13A and 13B, the dog face overlaps the search area RX. At this point, the classifier that sets the dog face to the determination target determines that the dog face is present in the search area RX. On the other hand, in FIG. 13A, the search area RX' is out of the dog face. At this point, the classifier determines that the dog face is not present in the search area RX'.

For example, in a device disclosed in Japanese Unexamined Patent Publication No. 2005-115525, a configuration of a classifier group constructed with the plurality of classifiers is updated such that determination accuracy of a specific sample image is enhanced. More particularly, the device selects the classifiers having the high determination accuracy of the sample image from the plurality of classifiers, and combines the selected classifiers to produce the new classifier group. Japanese Unexamined Patent Publication Nos. 2008-204103, 2009-64162, 2010-9517, 2010-61415, 2010-170199, and 2011-138387 also disclose technologies for updating the configuration of the classifier.

However, sometimes the individual determination targets of the classifier have unique features different from each other. For example, in the dog face, a nose length, a patter, and a color depend on the type of dog. In such cases, unfortunately the classifier does not exactly determine the specific determination target, or hardly determines the specific determination target. For example, it is possible that the classifier that sets the dog face to the determination target determines the dog face having the short nose (see FIG. 13A) well but have difficulties determining the dog face having the long nose (see FIG. 13B).

In the device of Japanese Unexamined Patent Publication No. 2005-115525, the new classifier group is constructed by the combination of the plurality of classifiers such that the determination accuracy of the sample image is enhanced. However, the plurality of classifiers constituting the classifier group are produced by learning from the instance in which the sample image is not used. Accordingly, sometimes each of the classifiers has low determination accuracy of the sample image. In this case, the determination accuracy of the sample image can be insufficiently enhanced in the classifier group constructed with the classifiers. Additionally, Japanese Unexamined Patent Publication Nos. 2008-204103, 2009-64162, 2010-9517, 2010-61415, 2010-170199, and 2011-138387 do not disclose the technologies for sufficiently enhancing the determination accuracy of the specific determination target.

SUMMARY

In accordance with an aspect of one embodiment of the present invention, there is provided a classifier update device configured to update a classifier that determines whether a specific type of a target included in image data is present using a predetermined criterion based on a value concerned with a predetermined feature quantity extracted from the image data, the classifier update device comprising: an image acquisition unit configured to acquire target image data comprising the specific type of a target; and a feature quantity update unit configured to update a reference value of the predetermined criterion in the classifier based on the target image data acquired by the image acquisition unit.

In accordance with another aspect of one embodiment of the present invention, there is provided a classifier update method in which a classifier update device updates a classifier that determines whether a specific type of a target included in image data is present using a predetermined criterion based on a value concerned with a predetermined feature quantity extracted from the image data, the classifier update method comprising the steps of: acquiring target image data comprising the specific type of a target; and updating a reference value of the predetermined criterion in the classifier based on the target image data.

In accordance with another aspect of one embodiment of the present invention, there is provided a non-transitory computer-readable medium, having stored thereon computer-readable instructions for executing, by a computer, a classifier update method in which a classifier update device updates a classifier that determines whether a specific type of a target included in image data is present using a predetermined criterion based on a value concerned with a predetermined feature quantity extracted from the image data, the classifier update method comprising the steps of: acquiring target image data comprising the specific type of a target; and updating a reference value of the predetermined criterion in the classifier based on the target image data.

In accordance with another aspect of one embodiment of the present invention, there is provided an information processing device comprising: the classifier update device and the classifier.

BRIEF DESCRIPTION OF THE DRAWINGS

FIGS. 2A and 2B are diagrams illustrating examples of reference positions and luminance information included in a feature quantity of a weak classifier included in the information processing device shown in FIG. 1;

DETAILED DESCRIPTION

The present invention has been devised in view of the problems described above, and an object thereof may be to provide a classifier update device that enhances the accuracy of the determination made by a classifier with respect to a specific determination target.

[First Embodiment]

Figure 3:
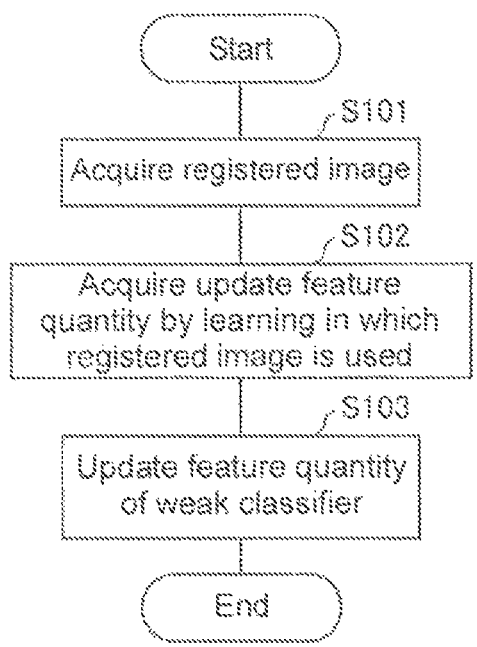
FIG. 3 is a flowchart illustrating a flow of general-purpose classifier update processing performed by a classifier update unit of the information processing device shown in FIG. 1.

A first embodiment of the present invention will be described below with reference to FIGS. 1 to 3.

[Configuration of Information Processing Device 1]

A configuration of an information processing device 1 according to a first embodiment will be described with reference to FIG. 1. FIG. 1 is a block diagram illustrating a configuration of the information processing device 1. As illustrated in FIG. 1, the information processing device 1 includes a general-purpose classifier 10 and a classifier update unit (classifier update device) 20.

The general-purpose classifier 10 determines a "cat face" as a determination target from an image. As illustrated in FIG. 1, the general-purpose classifier 10 is constructed with a group of N (N is a positive integer) weak classifiers 11 having a multi-layer structure. The classifier update unit 20 updates the weak classifier 11 constituting the general-purpose classifier 10 such that the general-purpose classifier 10 exactly determines the face of the cat (hereinafter referred to as a specific cat). The general-purpose classifier 10 and the classifier update unit 20 will be described in detail below.

[General-Purpose Classifier 10]

[a. Weak Classifier 11]

The weak classifier 11 has a unique feature quantity that is acquired by learning using an image (hereinafter referred to as a general-purpose image) that includes the determination target, namely, the cat face and an image (hereinafter referred to as another image) that does not include the determination target. At this point, for example, Japanese Unexamined Patent Publication No. 2005-115525 discloses a method for producing the weak classifier having the unique feature quantity by the learning in which the images are used.

The feature quantity of the weak classifier 11 includes a reference position in which two points in a search area are paired, luminance information correlated with the reference position, and a threshold (hereinafter referred to as a score threshold) of a score indicating a likelihood that the determination target is present in the search area. At this point, the luminance information is a luminance difference that is expected to be indicated at two reference positions constituting the pair when the determination target is present in the search area. The score indicates a degree of similarity between the luminance difference at the two reference positions constituting the pair and the luminance information. The weak classifier 11 determines that the determination target is present in the search area in the case that the score exceeds the score threshold by evaluating the score in the search area, and the weak classifier 11 determines that the determination target is not present in the search area in the case that the score is less than or equal to the score threshold by evaluating the score in the search area.

FIGS. 2A and 2B illustrate three pairs of reference positions FX1 to FX3 and FX4 to FX6 included in one of the weak classifiers 11 and three pieces of luminance information FY1 to FY3 and FY4 to FY6 corresponding to the reference positions. As illustrated in FIGS. 2A and 2B, the feature quantity of one of the weak classifiers 11 may include a plurality of paired reference positions and a plurality of pieces of luminance information correlated with the paired reference positions. However, in the case that the feature quantity includes the plurality of paired reference positions and the plurality of pieces of luminance information, an accumulation of scores each calculated using the luminance difference at the reference positions of the pair and the luminance information corresponding to the reference positions of the pair is the score of the search area.

A determination accuracy parameter indicating accuracy of a determination whether the search area includes the determination target is previously set to the weak classifier 11. The accuracy of the weak classifier 11 that determines the determination target increases with increasing determination accuracy parameter of the weak classifier 11. Generally the weak classifier 11 having the higher determination accuracy parameter includes more reference positions and pieces of luminance information. Therefore, a time necessary for the determination processing is lengthened in the weak classifier 11 having the higher determination accuracy parameter.

[b. Flow of Determination Performed by General-Purpose Classifier 10]

When the image is input to the general-purpose classifier 10 from the outside of the information processing device 1 or from an image data storage unit (not illustrated), the general-purpose classifier 10 sets the search area having a predetermined size on the image. As described below, the general-purpose classifier 10 determines whether the determination target is present in the search area while gradually moving the search area in the image.

First the weak classifier 11 in a first layer receives the image input at the general-purpose classifier 10 from the classifier update unit 20. The weak classifier 11 receiving the image determines whether the score of the search area exceeds a threshold. When the score of the search area exceeds a threshold, the search area passes through the weak classifier 11 in the first layer, and is input to the weak classifier 11 in the second layer. The weak classifiers 11 in layers from the second layer determine whether the score of the search area having passed through the weak classifier 11 in the preceding layer exceeds the threshold. When the weak classifier 11 in a certain layer determines that the score of the search area is less than or equal to the threshold, after the search area is moved in the image, the general-purpose classifier 10 returns to the step in which the weak classifier 11 in the first layer determines whether the score of the search area exceeds the threshold. On the other hand, when the search area passes through all the weak classifiers 11, the general-purpose classifier 10 determines that the determination target is present in the search area.

In the first embodiment, the general-purpose classifier 10 makes the determination of the whole image only once using the search area having a predetermined size. Actually, every time the general-purpose classifier 10 completes the determination of the whole image using the search area having the predetermined size, the general-purpose classifier 10 repeatedly determines the whole image while changing the size of the search area.

At this point, in the general-purpose classifier 10, desirably the lower determination accuracy parameter is set, as the layer of the weak classifier 11 (the weak classifier 11 having the smaller number in FIG. 1) becomes shallower, and the higher determination accuracy parameter is set, as the layer of the weak classifier 11 (the weak classifier 11 having the larger number in FIG. 1) becomes deeper. For example, in a case where ten (N=10) weak classifiers 11 constitute the general-purpose classifier 10, the determination accuracy parameters having the 10 and 30 reference position pairs and pieces of luminance information are set to the weak classifiers 11 in the first and second layers, and the determination accuracy parameter having the 140 reference position pairs and pieces of luminance information is set to the weak classifier 11 in the tenth layer. The determination accuracy parameter having the numbers of reference position pairs and pieces of luminance information between those of the weak classifier 11 in the second layer and the weak classifier 11 in the tenth layer is set to the weak classifiers 11 in the third to ninth layers.

Figure 13A:
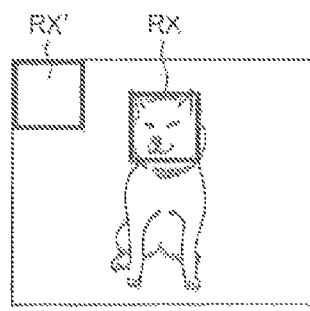
FIGS. 13A and 13B are diagrams schematically illustrating search areas set on an image by a general classifier.
Figure 13B:
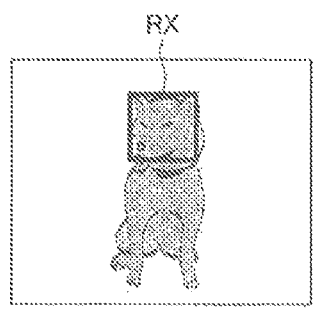

In the configuration of the first embodiment, the shallow-layer weak classifier 11 to which the low determination accuracy parameter is set removes the search area (for example, search area RX' in FIG. 13A) that obviously does not include the determination target (for example, search area RX' in FIG. 13A) in a short processing time (does not pass the search area therethrough). Then, the deep-layer weak classifier 11 to which the high determination accuracy parameter is set exactly determines whether the determination target is present in the search area having passed through the shallow-layer weak classifier 11. Accordingly, the deep-layer weak classifier 11 performs the determination processing only to the search area that has passed through the shallow-layer weak classifier 11. When compared with the configuration in which the shallow-layer weak classifier 11 has the same determination accuracy parameter as that of the deep-layer weak classifier 11, the processing time can be shortened while determination accuracy is maintained at the same level as that in the configuration of the first embodiment.

[Detail of Classifier Update Unit 20]

Figure 1:
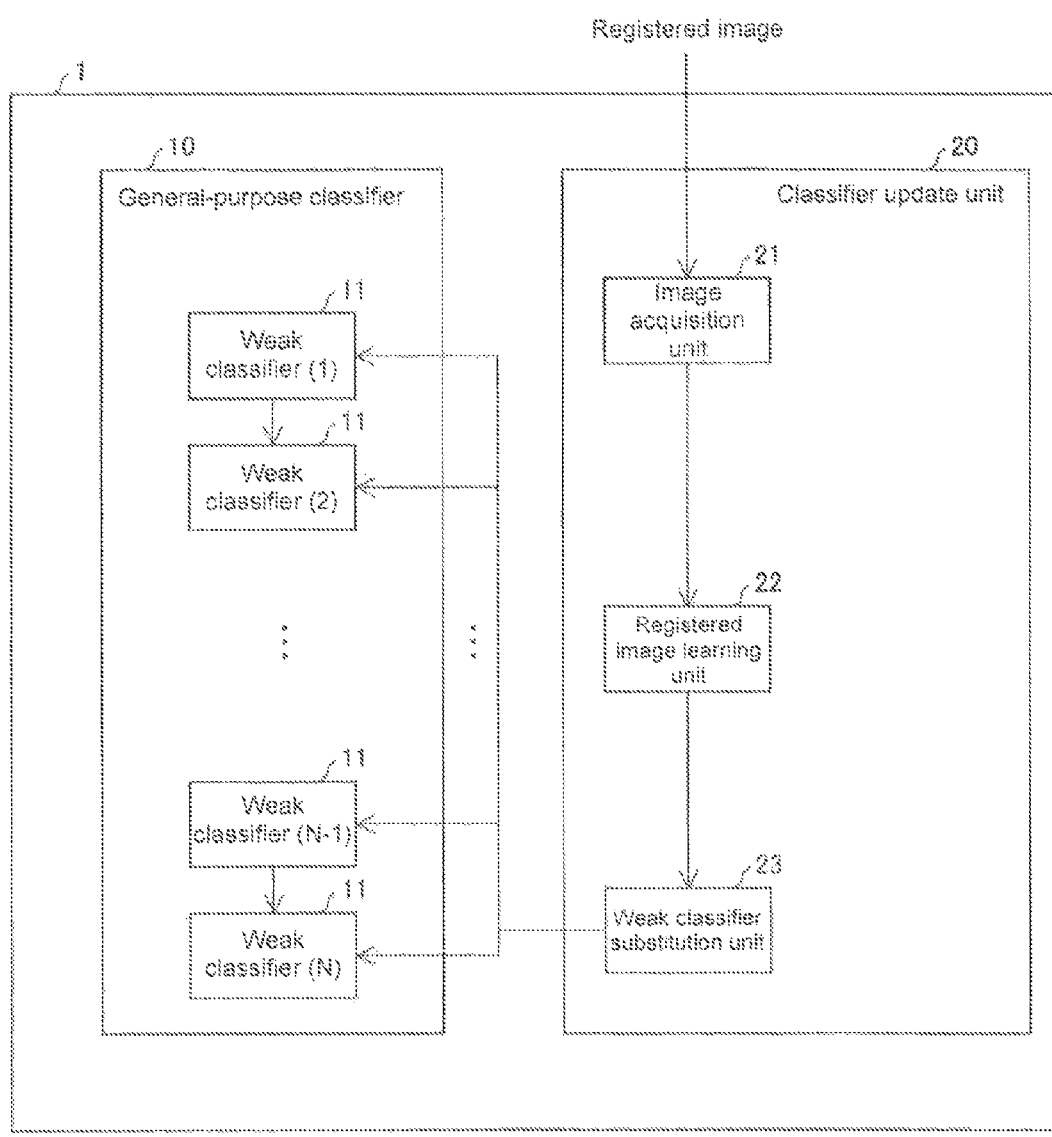
FIG. 1 is a block diagram illustrating a configuration of an information processing device according to one embodiment of the present invention.

As illustrated in FIG. 1, the classifier update unit 20 includes the image acquisition unit 21, the registered image learning unit (learning processor) 22, and the weak classifier substitution unit (feature quantity update unit) 23. The image acquisition unit 21 acquires a registered image that is of the "image of the face of the specific cat". The registered image is produced by a method in which the user selects the face area of the specific cat from the image including the specific cat. Desirably the number of the registered image is at least 100. Desirably the registered image is the image of which the face of the specific cat is captured in various directions. However, possibly the user feels that the inputs of many registered images are troublesome. It is not realistic that the user prepares at least 100 registered images. Therefore, the registered image learning unit 22 may produce a plurality of learning images from each registered image in a manner described below to acquire an update feature quantity.

The registered image learning unit 22 performs the learning using the registered image and the "image except cat face". More particularly, the registered image learning unit 22 performs an affine transformation to the registered image input by the user, and produces a plurality of learning images from the registered image, whereby the learning is performed using the learning images. Therefore, the registered image learning unit 22 acquires the feature quantity (the reference position, the luminance information, and the score threshold) in order to determine the specific cat. Using the acquired feature quantity, the registered image learning unit 22 produces an update classifier constructed with M update weak classifiers. The number M of update weak classifiers need not be equal to the number N of weak classifiers.

The weak classifier substitution unit (feature quantity update unit) 23 substitutes the feature quantity (the reference position and luminance information in FIG. 2A) of the update weak classifier acquired by the registered image learning unit 22 for the feature quantity (the reference position and luminance information in FIG. 2B) of the weak classifier 11 constituting the general-purpose classifier 10. In FIGS. 2A and 2B, the updated reference positions FX4 to FX6 and pieces of luminance information FY4 to FY6 in FIG. 2B correspond to the reference positions FX1 to FX3 and pieces of luminance information FY1 to FY3 in FIG. 2A.

Hereinafter, in order to distinguish the feature quantity of the update classifier from the feature quantity of the weak classifier 11, the feature quantity of the update classifier is referred to as an update feature quantity, and the reference position and luminance information included in the update feature quantity are referred to as an update reference position and update luminance information.

When substituting the update feature quantity of the update weak classifier for the feature quantity of the weak classifier 11, desirably, the weak classifier substitution unit 23 substitutes the update feature quantity of the update weak classifier such that the determination accuracy parameter comparable to that of the weak classifier 11 is set. This is because, firstly, there is a probability that an ability of the post-update general-purpose classifier 10 to determine the determination target is reduced compared to an ability of the pre-update general-purpose classifier 10 to determine the determination target if the update feature quantity of the update weak classifier having a determination accuracy parameter lower than that of the weak classifier 11 is substituted for the feature quantity of the weak classifier 11. Secondly, possibly the time needed for the post-update general-purpose classifier 10 to determine an image is increased compared to the time needed for the pre-update general-purpose classifier 10 to determine the same image if the update feature quantity of the update weak classifier having a the determination accuracy parameter higher than that of the weak classifier 11 is substituted for the feature quantity of the weak classifier 11.

The weak classifier substitution unit 23 may substitute the update feature quantity for all the feature quantities of the weak classifier 11. Alternatively, in the case that the update reference position that differs largely from one of the reference positions included in the feature quantity of the weak classifier 11 (namely, has the low degree of similarity) exists in the update reference position included in the feature quantity of the update weak classifier, the weak classifier substitution unit 23 may substitute the update reference position for the reference position. In the latter configuration, the weak classifier substitution unit 23 calculates the degree of similarity between each update reference position included in the feature quantity of the update weak classifier and each reference position included in the feature quantity of the weak classifier 11. In the case that an update reference position is found that has the degree of similarity to a reference position less than or equal to a predetermined value, the weak classifier substitution unit 23 substitutes the update reference position and the update luminance information correlated with the update reference position for the reference position and the luminance information correlated with the reference position.

[Flow of General-Purpose Classifier Update Processing α]

A flow of general-purpose classifier update processing α performed by the classifier update unit 20 will be described below with reference to FIG. 3. FIG. 3 is a flowchart illustrating the flow of the general-purpose classifier update processing α.

In the general-purpose classifier update processing α, the image acquisition unit 21 acquires the registered image that is of the face image of the specific cat (S101). The registered image learning unit 22 performs the learning using the registered image acquired from the image acquisition unit 21 (S102). The registered image learning unit 22 extracts the feature quantity (update feature quantity) in order to determine the face of the specific cat (S103). The registered image learning unit 22 generates the update classifier constructed with the weak classifier having the extracted update feature quantity. The weak classifier substitution unit 23 substitutes the update feature quantity for the feature quantity of the weak classifier 11 (S104). Thus, the general-purpose classifier update processing α is completed.

[First Modification]

In a first modification of the first embodiment, only the reference position may be updated in the feature quantity of the weak classifier 11. In the first modification, the weak classifier substitution unit 23 searches update luminance information X2 similar to luminance information X1 included in the feature quantity of the weak classifier 11. As used herein, "the luminance information X1 and the update luminance information X2 are similar to each other" means that, for example, a difference between the luminance information X1 and the update luminance information X2 is less than or equal to a predetermined value. In the case that the luminance information X1 and the update luminance information X2 are found to have the difference less than or equal to a predetermined value, the weak classifier substitution unit 23 substitutes the update reference position correlated with the update luminance information X2 for the reference position correlated with the luminance information X1.

[Second Modification]

In a second modification of the first embodiment, only the luminance information may be updated in the feature quantity of the weak classifier 11. In the second modification, the weak classifier substitution unit 23 searches an update reference position Y2 similar to a reference position Y1 included in the feature quantity of the weak classifier 11. As used herein, "the reference position Y1 and the update reference position Y2 are similar to each other" may mean that, for example, in the case that the reference position Y1 constituting a pair of two points and the update reference position Y2 constituting a pair of two points are properly correlated with each other on a one-on-one basis to form two sets of points, each of the sets has a distance between the two points correlated with each other less than or equal to a predetermined distance. In the case that the reference position Y1 and the update reference position Y2 are found to have the distance between the two points correlated with each other less than or equal to the predetermined distance, the weak classifier substitution unit 23 substitutes the update luminance information correlated with the update reference position Y2 for the luminance information correlated with the reference position Y1. Alternatively, in the second modification, the update reference position may be in an identical position to the reference position included in the feature quantity of the weak classifier 11. In this configuration, the weak classifier substitution unit 23 substitutes the luminance difference of the registered image at the reference position for the luminance information correlated with the reference position.

[Second Embodiment]

A second embodiment of the present invention will be described below with reference to FIGS. 4 and 5. For the sake of convenience, the component having the same function as that of the first embodiment is designated by the same numeral, and the description is neglected.

The classifier update unit 20 of the information processing device 1 of the first embodiment has the configuration in which the update feature quantity is substituted for the feature quantity of the weak classifier 11 irrespective of the determination whether the weak classifier 11 determines the registered image. On the other hand, a classifier update unit 220 (see FIG. 4) of the second embodiment updates the weak classifier 11 (false classifier) that cannot exactly determine the registered image, but does not update the weak classifier 11 that can exactly determine the registered image. Therefore, compared with the general-purpose classifier 10 updated by the classifier update unit 20, in the general-purpose classifier 10 updated by the classifier update unit 220, the determination ability to exactly determine the general-purpose image is enhanced while the determination ability to determine the registered image is maintained at the same level. This is because the weak classifier 11 that can determine the registered image is left without update in the post-update general-purpose classifier 10.

Figure 4:
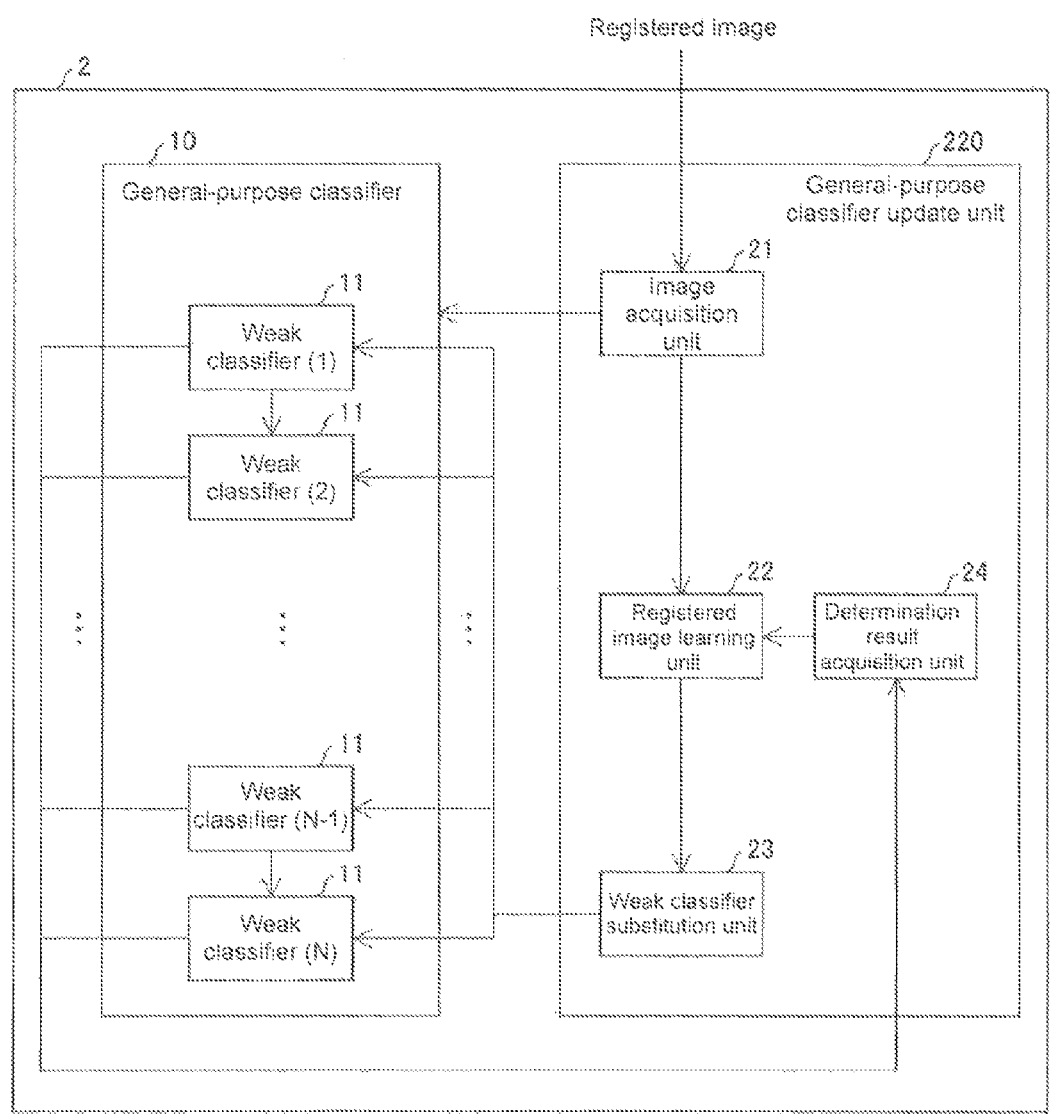
FIG. 4 is a block diagram illustrating a configuration of an information processing device according to another embodiment of the present invention.
Figure 5:
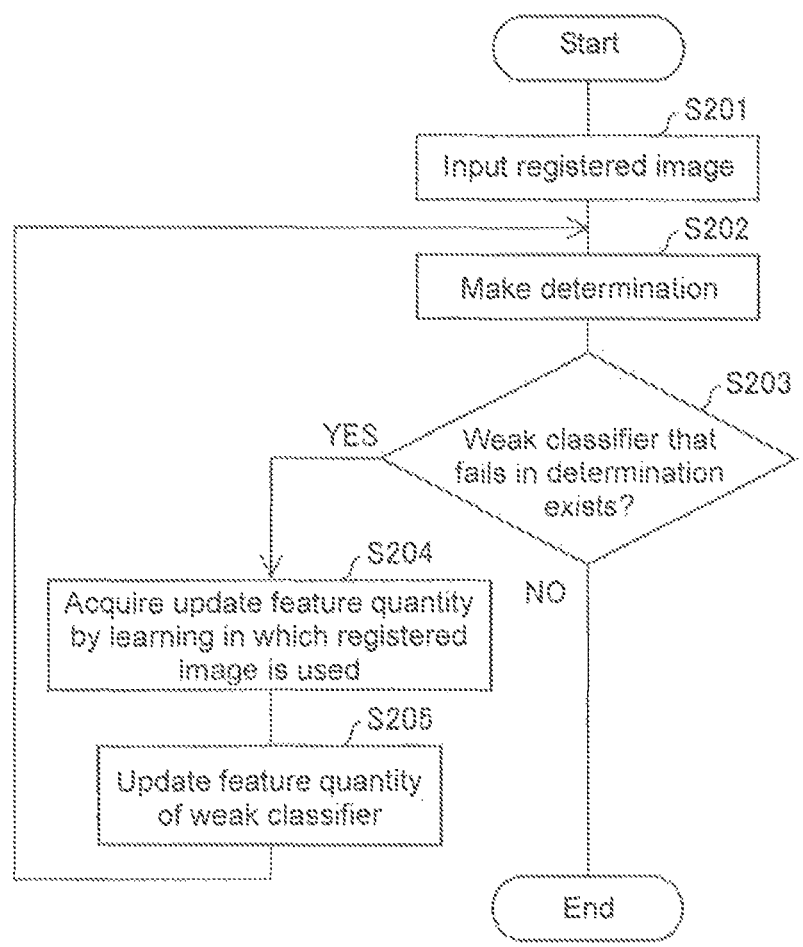
FIG. 5 is a flowchart illustrating a flow of the general-purpose classifier update processing performed by the classifier update unit of the information processing device shown in FIG. 4.

FIG. 4 is a block diagram of an information processing device 2 of the second embodiment. The classifier update unit 220 of the information processing device 2 includes a determination result acquisition unit 24 in addition to the configuration of the classifier update unit 20 of the information processing device 1 in FIG. 1. In the second embodiment, the image acquisition unit 21 inputs the registered image to the general-purpose classifier 10, and the weak classifiers 11 constituting the general-purpose classifier 10 determine the input registered image. The determination result acquisition unit 24 acquires the registered-image determination result of each weak classifier 11. That is, the determination result acquisition unit 24 acquires based on whether each weak classifier 11 can exactly determine the registered image. The weak classifier substitution unit 23 acquires the determination result of the weak classifier 11 from the determination result acquisition unit 24, and substitutes the update feature quantity for the feature quantity of the weak classifier 11 (hereinafter referred to as a false classifier) that cannot exactly determine the registered image in the weak classifiers 11 constituting the general-purpose classifier 10.

[Flow of General-Purpose Classifier Update Processing β]

A flow of general-purpose classifier update processing β performed by the classifier update unit 220 will be described below with reference to FIG. 5. FIG. 5 is a flowchart illustrating the flow of the general-purpose classifier update processing β.

In the general-purpose classifier update processing β, the image acquisition unit 21 inputs the registered image, which is input by the user, to the general-purpose classifier 10 (S201). When the registered image is input to the general-purpose classifier 10, the weak classifier 11 determines the registered image (S202). The determination result acquisition unit 24 acquires the registered-image determination result of the weak classifier 11. The weak classifier substitution unit 23 determines whether the weak classifier (false classifier) that cannot exactly determine the registered image exists (S203). When the weak classifier substitution unit 23 determines that the false classifier does not exist (NO in S203), the general-purpose classifier update processing β is ended.

On the other hand, in S203, when the weak classifier substitution unit 23 determines that the false classifier exists (YES in S203), the registered image learning unit 22 acquires the update feature quantity by the learning from the instance in which the registered image is used (S204). Then the weak classifier substitution unit 23 substitutes the update feature quantity of the update weak classifier having the determination accuracy parameter comparable to the false classifier for the feature quantity of the false classifier (S205). Thus, the false classifier is updated. At this point, like in the first embodiment, the weak classifier substitution unit 23 may update both the reference position and luminance information included in the feature quantity of the false classifier. Alternatively, like in the modifications of the first embodiment, only one of the reference position and the luminance information may be updated.

Then the flow returns to the processing in S202 in which the weak classifier 11 determines the registered image. When another false classifier that cannot exactly determine the registered image exists (YES in S203), the pieces of processing in S204 and S205 are repeated. When the weak classifier substitution unit 23 determines that the false classifier does not exist (NO in S203), the general-purpose classifier update processing β is ended.

[Third Embodiment]

A third embodiment of the present invention will be described below with reference to FIGS. 6 and 7. For the sake of convenience, the component having the same function as that of the first and second embodiments is designated by the same numeral, and the description is neglected.

Similarly to the classifier update unit 220 of the information processing device 2 of the second embodiment, a classifier update unit 320 (see FIG. 6) of an information processing device 3 of the third embodiment updates only the weak classifier (false classifier) that cannot exactly determine the registered image in the weak classifiers 11 constituting the general-purpose classifier 10. However, the classifier update unit 220 of the second embodiment updates the reference position and/or the luminance information in the feature quantity of the false classifier using the update feature quantity that is acquired by the learning from the instance in which the registered image is used. On the other hand, the classifier update unit 320 of the third embodiment updates the score threshold in the feature quantity of the false classifier. Accordingly, the classifier update unit 320 does not acquire the update feature quantity. The classifier update unit 320 of the third embodiment differs from the classifier update unit 220 of the second embodiment in this point.

[Configuration of Information Processing Device 3]

Figure 6:
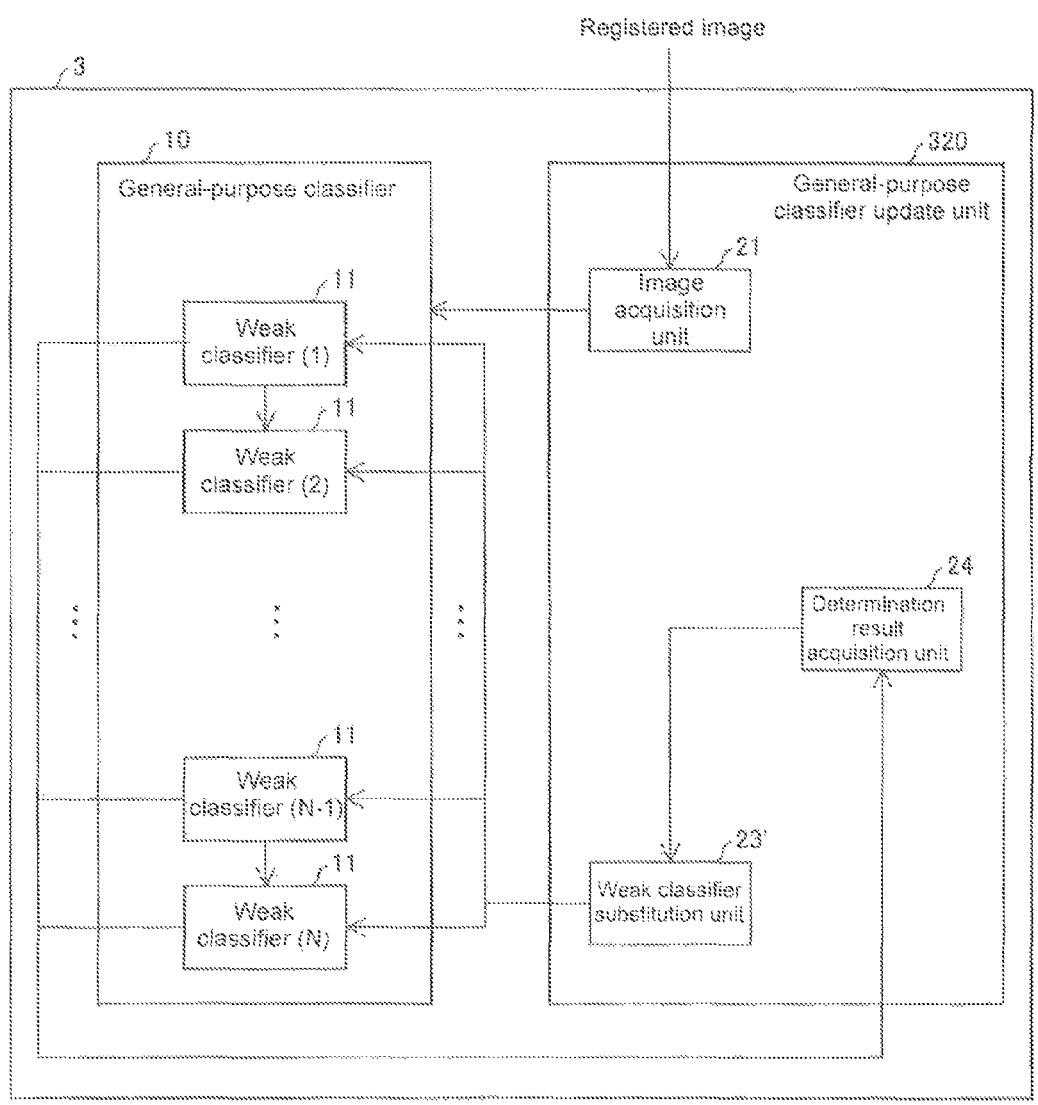
FIG. 6 is a block diagram illustrating a configuration of an information processing device according to still another embodiment of the present invention.
Figure 7:
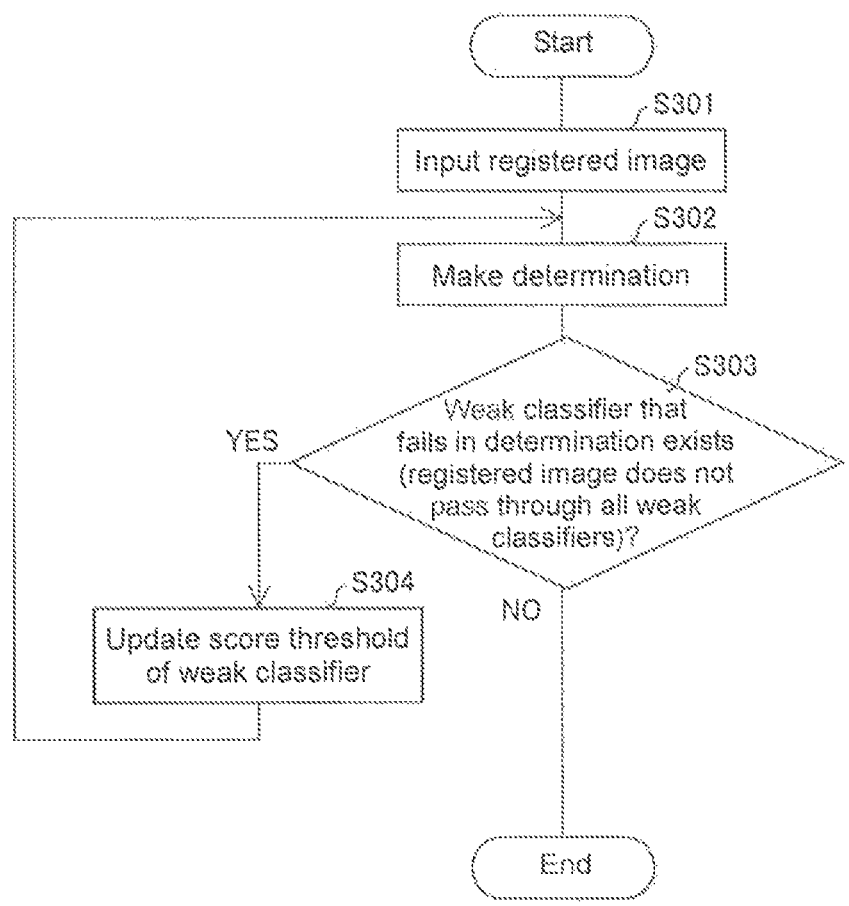
FIG. 7 is a flowchart illustrating a flow of the general-purpose classifier update processing performed by the classifier update unit of the information processing device shown in FIG. 6.

FIG. 6 is a block diagram of the information processing device 3. As illustrated in FIG. 6, the classifier update unit 320 of the information processing device 3 does not include the registered image learning unit 22 in the configuration of the classifier update unit 220 of the information processing device 2. The weak classifier substitution unit 23 of the classifier update unit 220 updates the reference position and/or the luminance information in the feature quantity of the false classifier. On the other hand, a weak classifier substitution unit (feature quantity update unit) 23' of the classifier update unit 320 updates the score threshold in the feature quantity of the false classifier.

[Flow of General-Purpose Classifier Update Processing γ]

A flow of general-purpose classifier update processing γ performed by the classifier update unit 320 will be described below with reference to FIG. 7. FIG. 7 is a flowchart illustrating the flow of the general-purpose classifier update processing γ.

In the general-purpose classifier update processing γ, the image acquisition unit 21 inputs the registered image acquired from the outside or the image data storage unit (not illustrated) to the general-purpose classifier 10 (S301). The weak classifier 11 to which the registered image is input determines the registered image (S302). Then the determination result acquisition unit 24 acquires the registered-image determination result of each weak classifier 11. The weak classifier substitution unit 23 acquires the registered-image determination result of the weak classifier 11 from the determination result acquisition unit 24, and determines whether the weak classifier (false classifier) that cannot exactly determine the registered image exists (S303). When the false classifier exists (YES in S303), the weak classifier substitution unit 23' updates the score threshold included in the feature quantity of the false weak classifier (S304). Specifically, the weak classifier substitution unit 23' updates the score threshold such that the score of the registered image evaluated by the false classifier exceeds the score threshold.

Then the flow returns to the processing in S302 in which the weak classifier 11 determines the registered image. When another false classifier that cannot exactly determine the registered image exists (YES in S303), the processing in S304 is performed again. When the weak classifier substitution unit 23' determines that the false classifier does not exist (NO in S303), the general-purpose classifier update processing γ is ended.

[Fourth Embodiment]

A fourth embodiment of the present invention will be described below with reference to FIGS. 8 to 12. For the sake of convenience, the component having the same function as that of the first to third embodiments is designated by the same numeral, and the description is neglected.

During an off-line period during which the input of the new image (the registered image, the general-purpose image, and other images) is not received from the outside, an information processing device 4 of the fourth embodiment generates patterns of the plurality of weak classifiers 11 as a single-layer weak classifier 11 (hereinafter referred to as a weak classifier 11) constituting the general-purpose classifier 10. In the case that the registered image is input during an on-line period during which the input of the new image (the registered image, the general-purpose image, and other images) is received from the outside, a classifier update unit 420 (see FIG. 8) of the information processing device 4 selects the weak classifier 11 having the high determination ability to exactly determine the registered image from the patterns of the plurality of weak classifiers 11 generated during the off-line period.

[Configuration of Information Processing Device 4]

Figure 8:
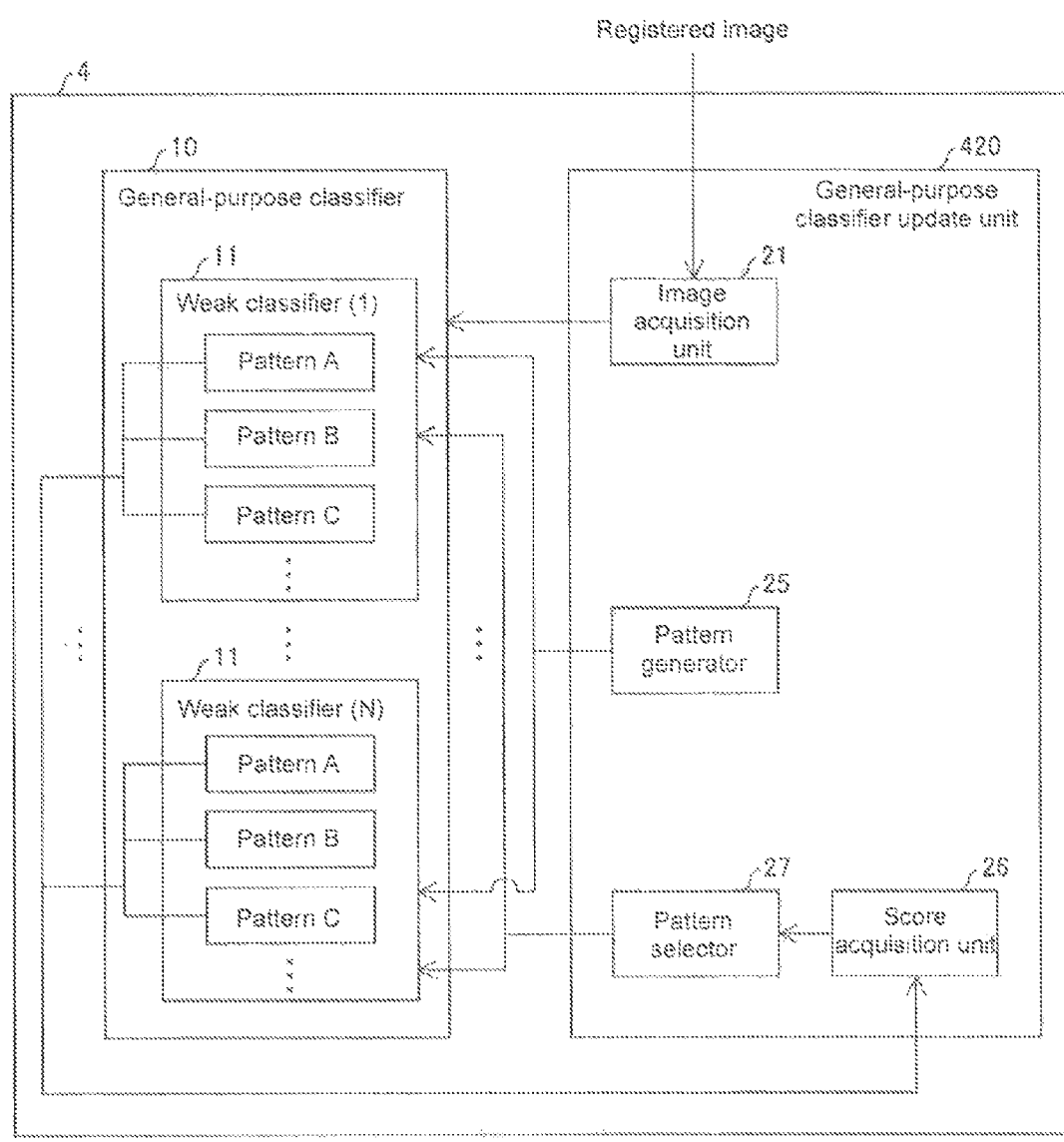
FIG. 8 is a block diagram illustrating a configuration of an information processing device according to yet another embodiment of the present invention.

FIG. 8 is a block diagram of the information processing device 4. The classifier update unit 420 of the information processing device 4 further includes a pattern generator 25, a score acquisition unit 26, and a pattern selector (feature quantity update unit) 27 in addition to the image acquisition unit 21. The pattern generator 25 generates the plurality of patterns of the weak classifier 11 in the same layer in the general-purpose classifier 10. The score acquisition unit 26 acquires the score of the registered image that is evaluated by the patterns generated by the pattern generator 25. The pattern selector 27 selects the pattern with which the registered image is evaluated by the largest score in the patterns of the weak classifier 11 in a certain layer, as the weak classifier 11 in the layer concerned.

[Pattern Generator 25]

Figure 9:
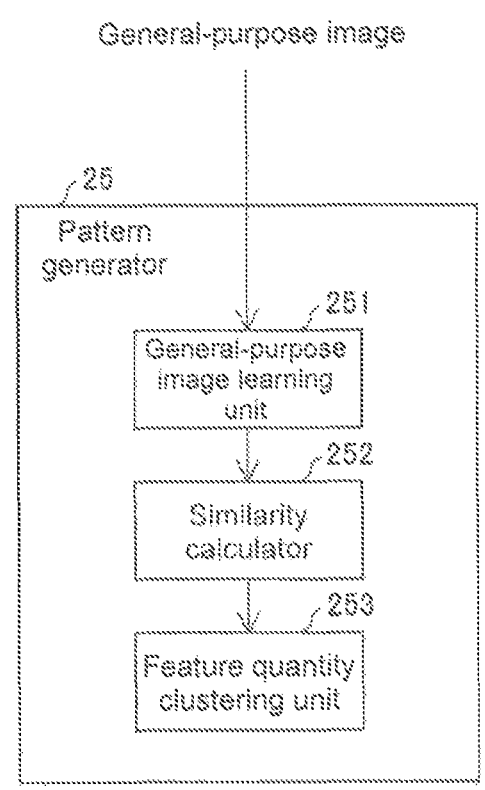
FIG. 9 is a block diagram illustrating a configuration of a patter generator included in the information processing device shown in FIG. 8.

The detailed configuration of the pattern generator 25 will be described with reference to FIG. 9. FIG. 9 is a block diagram illustrating the configuration of the pattern generator 25. As illustrated in FIG. 9, the pattern generator 25 includes a general-purpose image learning unit 251, a similarity calculator 252, and a feature quantity clustering unit 253.

The general-purpose image learning unit 251 acquires the feature quantity (feature quantity A) in order to determine the cat face by the learning from the instance in which the images (general-purpose images) of various cat faces and images (other images) except the cat face are used. The images of various cat faces and images except the cat face are input from the image data storage unit (not illustrated) or the outside of the information processing device 4. After acquiring the feature quantity A, the general-purpose image learning unit 251 acquires the feature quantity (feature quantity B) of the cat face again using the general-purpose image used in the previous learning or another general-purpose image. Thus, the general-purpose image learning unit 251 learns the plurality of feature quantities A, B, . . . . The similarity calculator 252 calculates the degree of similarity between the feature quantities (luminance information) acquired by the general-purpose image learning unit 251. The feature quantity clustering unit 253 performs clustering of the feature quantities in which the degree of similarity calculated by the similarity calculator 252 is greater than or equal to a predetermined value.

More particularly, the feature quantity clustering unit 253 performs the clustering of the feature quantities having the pieces of luminance information in which the degree of similarity is greater than or equal to the predetermined value. As used herein, "the pieces of luminance information are similar to each other" means that the difference between the pieces of luminance information is less than or equal to the predetermined value between the patterns. Particularly, in the case that the plurality of pieces of luminance information are included in the feature quantity of each pattern, "the pieces of luminance information are similar to each other" means that, when the pieces of luminance information are properly correlated with each other on a one-to-one basis between the patterns, all the differences between the pieces of luminance information correlated with each other are less than or equal to the predetermined value.

Figure 10:
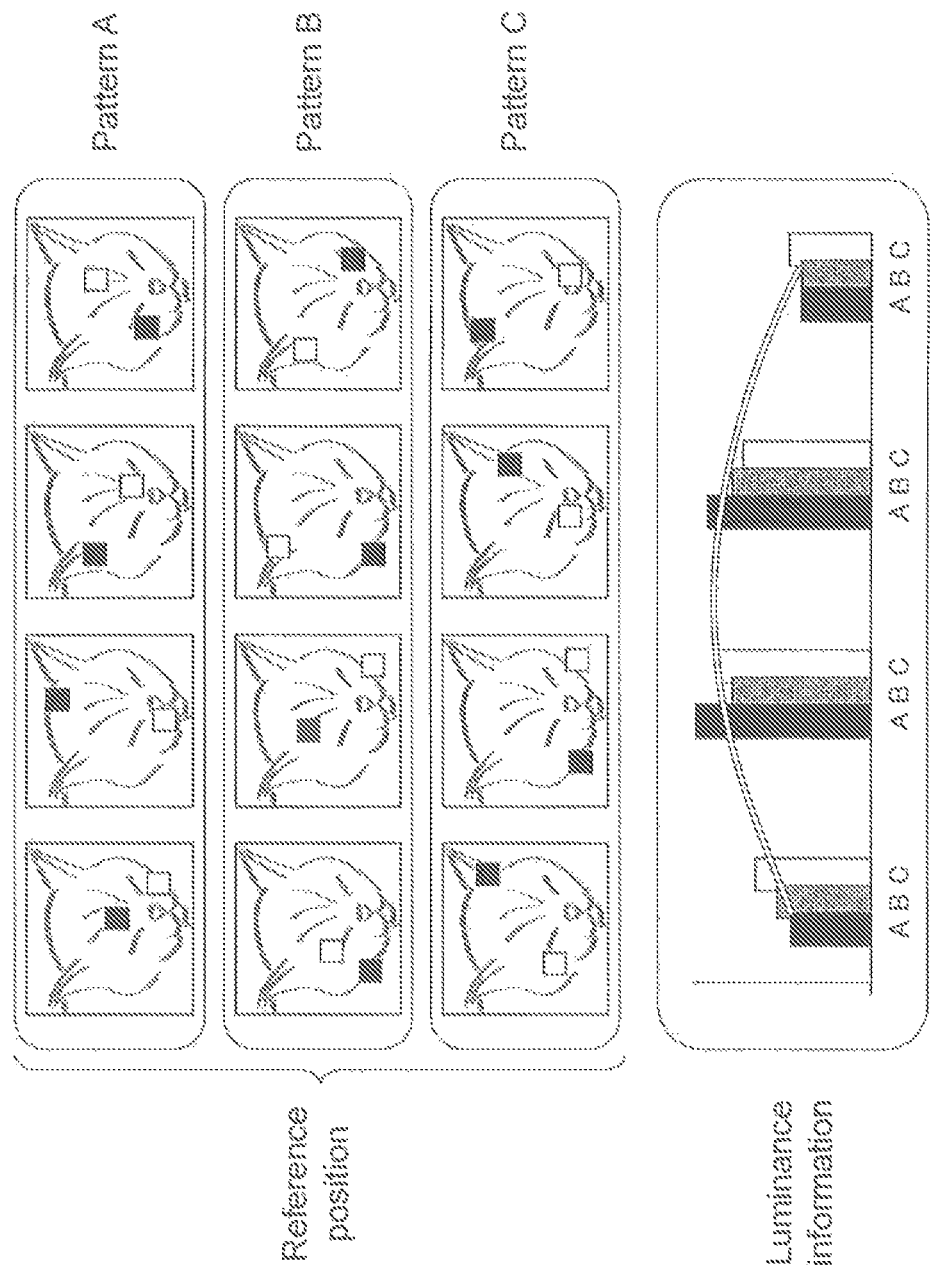
FIG. 10 is a diagram illustrating an example of a pattern of the weak classifier included in the information processing device shown in FIG. 8.

The pattern generator 25 generates the plurality of weak classifiers having the feature quantities that are subjected to the clustering by the feature quantity clustering unit 253 as the pattern of the weak classifier 11 in the same layer of the general-purpose classifier 10. FIG. 10 illustrates an example of the patterns of the weak classifier 11. The four reference positions and the four pieces of luminance information are included in the feature quantity of each of the three patterns A to C in FIG. 10. As illustrated in FIG. 10, the four pieces of luminance information included in the feature quantity of each of the patterns A to C are similar to one another. As illustrated in FIG. 10, the reference positions included in the feature quantities subjected to the clustering need not be similar to one another.

Figure 11:
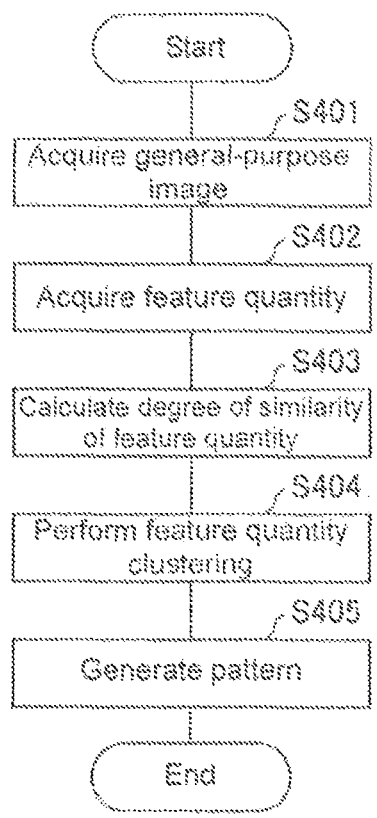
FIG. 11 is a flowchart illustrating a flow of the general-purpose classifier update processing performed by the pattern generator shown in FIG. 9.

A flow of pattern generation processing in which the pattern generator 25 generates the pattern of the weak classifier 11 will be described with reference to FIG. 11. FIG. 11 is a flowchart illustrating the flow of the patter generation processing.

In the pattern generation processing, the general-purpose image learning unit 251 acquires the general-purpose image and another image (S401). Then the general-purpose image learning unit 251 acquires the feature quantity in order to determine the determination target by the learning from the instance in which the acquired images are used (S402). The general-purpose image learning unit 251 learns the plurality of feature quantities by repeating the pieces of processing in S401 and S402. Then the similarity calculator 252 calculates the degree of similarity between the feature quantities acquired by the general-purpose image learning unit 251 (S403). The feature quantity clustering unit 253 performs the clustering of the feature quantities in which the degree of similarity calculated by the similarity calculator 252 is greater than or equal to the predetermined value (S404). After generating the weak classifier 11 having the feature quantity learned by the general-purpose image learning unit 251, the pattern generator 25 sets the plurality of weak classifiers 11 having the feature quantities subjected to the clustering by the feature quantity clustering unit 253 to the weak classifier 11 in the same layer of the general-purpose classifier 10, namely, the patter (S405). Thus, the patter generation processing is completed.

[Flow of General-Purpose Classifier Update Processing δ]

Figure 12:
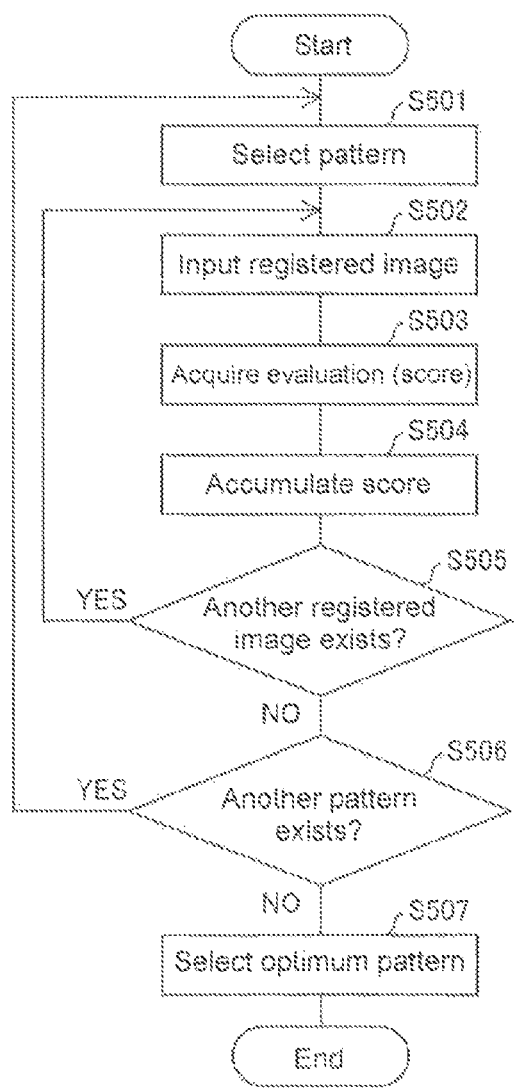
FIG. 12 is a flowchart illustrating a flow of the general-purpose classifier update processing performed by the classifier update unit of the information processing device shown in FIG. 8.

A flow of general-purpose classifier update processing δ performed by the classifier update unit 420 of the information processing device 4 will be described below with reference to FIG. 12. FIG. 12 is a flowchart illustrating the flow of the general-purpose classifier update processing δ. It is assumed that, in advance of the general-purpose classifier update processing δ, it is assumed that the pattern generator 25 has already generated the pattern of each weak classifier of the general-purpose classifier 10.

In the general-purpose classifier update processing δ, the image acquisition unit 21 selects one of the patterns of the weak classifier 11 in a certain layer (S501). Then the image acquisition unit 21 acquires the registered image, and inputs the registered image to the selected pattern (S502). The registered image is evaluated in the pattern to which the registered image is input. Then the score acquisition unit 26 acquires the score of the registered image from the pattern in which the registered image is evaluated (S503). In the case that the previously-acquired score exists, the score acquisition unit 26 accumulates the acquired score to the previously-acquired score (S504). Then the image acquisition unit 21 determines whether another registered image exists (S505). When another registered image exists (YES in S505), the general-purpose classifier update processing δ returns to the processing in S502, and the pieces of processing in S502 to S504 are performed again.

On the other hand, in S 505, when another registered image does not exist (NO in S505), the score acquisition unit 26 determines whether another pattern exists (S506). When another pattern exists (YES in S506), the general-purpose classifier update processing δ returns to the processing in S501. On the other hand, when another pattern does not exist (NO in S506), the pattern selector 27 determines the pattern in which the score (accumulated value) of the registered image is maximized (S507).

[Implementation Example by Software]

Each unit (control block) constituting the update units 1 to 4 may be constructed with a logic circuit (hardware) formed in an integrated circuit (IC chip) or software using a CPU (Central Processing Unit).

In the latter case, each of the update units 1 to 4 includes: the CPU for issuing a command of a program, wherein the command of the program being software for implementing various functions; a ROM (Read Only Memory) or a storage device (hereinafter referred to as a "recording medium") in which the program and various pieces of data are recorded while being readable with a computer (or CPU); and a RAM (Random Access Memory) in which the program is expanded. The computer (or CPU) reads the program from the recording medium to execute the program, thereby achieving the object of the present invention. "Non-transitory tangible mediums" such as a tape, a disk, a card, a semiconductor memory, and a programmable logic circuit can be used as the recording medium. The program may be supplied to the computer through any transmission carrier (such as a communication network and broadcasting wave) through which the program can be transmitted. The present invention can also be implemented in the form of a data signal embedded in a carrier wave in which the program is materialized by electronic transmission.

More information on embodiments of the invention are provided as follows. In accordance with one aspect of at least one embodiment of the present invention, there is provided a classifier update device of the present invention configured to update a classifier that determines whether a specific type of a target included in image data is present using a predetermined criterion based on a value concerned with a predetermined feature quantity extracted from the image data, the classifier update device includes: an image acquisition unit configured to acquire target image data including the specific type of a target; and a feature quantity update unit configured to update a reference value of the predetermined criterion in the classifier based on the target image data acquired by the image acquisition unit.

In accordance with another aspect of at least one embodiment of the present invention, there is provided a classifier update method of the present invention in which a classifier update device updates a classifier that determines whether a specific type of a target included in image data is present using a predetermined criterion based on a value concerned with a predetermined feature quantity extracted from the image data, the classifier update method includes the steps of: acquiring target image data including the specific type of a target; and updating a reference value of the predetermined criterion in the classifier based on the target image data.

According to the configuration, the reference value of the predetermined criterion included in the classifier is updated based on the target image data that is of the image data including the specific type of target. That is, the reference value of the predetermined criterion included in the classifier is updated according to the target image data acquired by the image acquisition unit. Specifically, the reference value of the predetermined criterion is updated such that the classifier accurately determines the newly-acquired target image data.

A user inputs the target image data including a certain target to the classifier update device having the configuration. Therefore, the determination accuracy of the classifier with respect to the target can be enhanced.

In the classifier update of the present invention, the feature quantity update unit may be configured to update a reference value of the predetermined feature quantity in the classifier as the reference value of the predetermined criterion.

According to the configuration, the reference value of the predetermined feature quantity is updated based on the target image data acquired by the image acquisition unit. For example, the reference value of the predetermined feature quantity is updated so as to have the value closer to the feature quantity extracted from the acquired target image data. Therefore, the classifier more easily determines the target included in the acquired target image data. In other words, the determination accuracy of the classifier with respect to the target is enhanced.

The classifier update device of the present invention may further include a learning processor configured to calculate the reference value of the predetermined feature quantity as an update reference value by learning the target image data. In the classifier update device, the feature quantity update unit may be configured to update the reference value of the predetermined feature quantity in the classifier based on the update reference value calculated by the learning processor.

According to the configuration, the update reference value that is of the reference value of the feature quantity is calculated in order to determine the target image data by the learning from the instance in which target image data is used. Then, the reference value of the predetermined feature quantity included in the classifier is updated based on the update reference value. For example, the update reference value is substituted for the reference value of the predetermined feature quantity included in the classifier. Therefore, the classifier more easily determines the target included in the target image data used in the learning. In other words, the determination accuracy of the classifier with respect to the target is enhanced.

In the classifier update device of the present invention, the predetermined feature quantity may be at least one of a reference position and luminance information of the reference position, wherein the reference position is a position of a pixel, and the luminance information in the image data refers to the position of the pixel.

According to the configuration, the classifier determines the target included in the target image data based on one of the reference position that is of the position of the pixel and the luminance information at the reference position. Accordingly, the target is determined by the feature quantity, such as the reference position and the luminance information, which is included in the image data in general. At this point, the reference position may be positions of one pair constructed with two points or positions of a plurality of pairs. The luminance information may be a luminance difference or a magnitude relationship of luminance between the reference positions constituting the pair.

The classifier update device of the present invention may further include a determination result acquisition unit configured to acquire a determination result of a each of a plurality of weak classifiers with respect to the target image data acquired by the image acquisition unit. In the classifier update device, the classifier may be constructed with the plurality of weak classifiers, and the feature quantity update unit may be configured to update the reference value of the predetermined criterion in only the weak classifier in which the target image data is determined not to include the specific type of a target.

According to the configuration, the reference value of the weak classifier that does not exactly determine the target included in the specific target image data acquired by the image acquisition unit is updated in the reference values of the predetermined criteria included in the plurality of weak classifiers. Therefore, the weak classifiers exactly determine the target included in the specific target image data easily. On the other hand, the reference value of the weak classifier that exactly determines the target included in the specific target image data is not updated. Therefore, the reference value of the weak classifier is maintained in the original state, so that the target included in the target image data except the specific target image data can accurately be determined. Accordingly, the classifier constructed with the weak classifiers having the characteristics can accurately determine the target included in the specific target image data acquired by the image acquisition unit, and accurately determine the target included in other pieces of target image data.

In the classifier update device of at least one embodiment of the present invention, the predetermined criterion may be based on whether a difference between a value concerned with the predetermined feature quantity extracted from the target image data acquired by the image acquisition unit and the reference value of the predetermined feature quantity in the classifier exceeds a predetermined threshold, and the feature quantity update unit may be configured to update the predetermined threshold of the reference value of the predetermined criterion.

According to the configuration, the predetermined threshold that is of the reference value of the predetermined criterion is updated based on the target image data acquired by the image acquisition unit. Specifically, the predetermined threshold is updated such that the value concerned with the predetermined feature quantity extracted from the target included in the target image data acquired by the image acquisition unit becomes less than or equal to the predetermined threshold. Therefore, the classifier more accurately determines the target included in the target image data acquired by the image acquisition unit.

The classifier update device of at least one embodiment of the present invention may further include a score acquisition unit configured to acquire a score of a determination result of the classifier in each of a plurality of patterns with respect to the target image data acquired by the image acquisition unit. In the classifier update device, the classifier includes the plurality of patterns of the reference value of the predetermined feature quantity, and the feature quantity update unit may be configured to perform update such that the patter having the highest score acquired by the score acquisition unit is set to the reference value of the predetermined feature quantity in the classifier.

According to the configuration, the score expressing a likelihood that the specific type of target is included in the target image data acquired by the image acquisition unit is acquired in each pattern included in the classifier. The pattern having the highest score is set to the reference value of the predetermined feature quantity in the classifier. Therefore, the classifier exactly determines the target image data acquired by the image acquisition unit (that is, the classifier determines that the specific type of target is included in the target image data).

The classifier update device of the above aspect may be constructed with a computer. In this case, at least one embodiment of the present invention may also include a control program for the classifier update device causing the computer to act as each of the units of the classifier update device.

At least one embodiment of the present invention may also include an information processing device including the classifier update device and the classifier.

The present invention is not limited to the above embodiments, but various changes can be made without departing from the scope of the claims. That is, an embodiment obtained by a combination of technical means disclosed in different embodiments is also included in the present invention.

The present invention can be applied to the information processing device that determines the determination target from the image.

What is claimed is:

1. A classifier update device configured to update a classifier that determines whether a specific type of a target included in image data is present using a predetermined criterion based on a value concerned with a predetermined feature quantity extracted from the image data, the classifier update device comprising:
a logic circuit formed in an integrated circuit or a processing unit configured to control the classifier update device to function as:
an image acquisition unit configured to acquire target image data comprising the specific type of the target; and
a feature quantity update unit configured to update a reference value of the predetermined criterion in the classifier based on the target image data acquired by the image acquisition unit;
wherein the predetermined criterion is whether a difference between the value concerned with a predetermined feature quantity extracted from the target image data acquired by the image acquisition unit and the reference value of the predetermined feature quantity in the classifier exceeds a predetermined threshold and the feature quantity update unit is configured to update the predetermined threshold of the reference value of the predetermined criterion.

2. The classifier update device according to claim 1, wherein the feature quantity update unit is configured to update a reference value of the predetermined feature quantity in the classifier as the reference value of the predetermined criterion.

3. The classifier update device according to claim 2, further comprising:
a learning processor configured to calculate the reference value of the predetermined feature quantity as an update reference value by learning the target image data;
wherein the feature quantity update unit is configured to update the reference value of the predetermined feature quantity in the classifier based on the update reference value calculated by the learning processor.

4. The classifier update device according to claim 1, wherein the predetermined feature quantity is at least one of a reference position and luminance information of the reference position, wherein the reference position is a position of a pixel, and the luminance information in the image data refers to the position of the pixel.

5. The classifier update device according to claim 1, wherein the classifier update device is controlled by the logic circuit to function as:
a determination result acquisition unit configured to acquire a determination result of each of a plurality of weak classifiers with respect to the target image data acquired by the image acquisition unit;
wherein the classifier is constructed with the plurality of weak classifiers, and the feature quantity update unit is configured to update the reference value of the predetermined criterion in only the weak classifier in which the target image data is determined not to comprise the specific type of a target.

6. The classifier update device according to claim 1, wherein the classifier update device is controlled by the logic circuit to function as:
a score acquisition unit configured to acquire a score of a determination result of the classifier in each of a plurality of patterns with respect to the target image data acquired by the image acquisition unit;

wherein:

the classifier comprises the plurality of patterns of the reference value of the predetermined feature quantity; and the feature quantity update unit is configured to perform update such that the pattern having the highest score acquired by the score acquisition unit is set to the reference value of the predetermined feature quantity in the classifier.

7. An information processing device comprising:
the classifier update device according to claim 1; and
the classifier.

8. A classifier update method in which a classifier update device updates a classifier that determines whether a specific type of a target included in image data is present using a predetermined criterion based on a value concerned with a predetermined feature quantity extracted from the image data, the classifier update method comprising:

acquiring target image data comprising the specific type of a target;

updating a reference value of the predetermined criterion in the classifier based on the target image data, the predetermined criterion being whether a difference between the value concerned with a predetermined feature quantity extracted from the target image data acquired and the reference value of the predetermined feature quantity in the classifier exceeds a predetermined threshold; and updating the predetermined threshold of the reference value of the predetermined criterion.

9. A non-transitory computer-readable medium, having stored thereon computer-readable instructions for executing, by a computer, a classifier update method in which a classifier update device updates a classifier that determines whether a specific type of a target included in image data is present using a predetermined criterion based on a value concerned with a predetermined feature quantity extracted from the image data, the classifier update method comprising:

acquiring target image data comprising the specific type of a target;

updating a reference value of the predetermined criterion in the classifier based on the target image data, the predetermined criterion being whether a difference between the value concerned with a predetermined feature quantity extracted from the target image data acquired and the reference value of the predetermined feature quantity in the classifier exceeds a predetermined threshold; and updating the predetermined threshold of the reference value of the predetermined criterion.

* * * * *